(12) United States Patent
Furusawa et al.

(10) Patent No.: US 7,209,941 B2
(45) Date of Patent: Apr. 24, 2007

(54) SYSTEM AND METHOD FOR DISTRIBUTING CONTENTS FROM A CHILD SERVER BASED ON A CLIENT'S CURRENT LOCATION

(75) Inventors: Toyoaki Furusawa, Kawasaki (JP); Atsushi Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 670 days.

(21) Appl. No.: 09/781,326

(22) Filed: Feb. 13, 2001

(65) Prior Publication Data
US 2001/0042110 A1  Nov. 15, 2001

(30) Foreign Application Priority Data
May 11, 2000  (JP) .............................. 2000-138536

(51) Int. Cl.
*G06F 13/00* (2006.01)
(52) U.S. Cl. .................................................... 709/202
(58) Field of Classification Search ................ 709/200, 709/203, 208, 211, 216, 219, 201, 226; 711/100, 711/117, 118, 119, 126, 133, 136; 715/530
See application file for complete search history.

(56) References Cited
U.S. PATENT DOCUMENTS
6,052,718 A * 4/2000 Gifford ........................ 709/219
6,167,438 A * 12/2000 Yates et al. .................. 709/216
6,799,214 B1 * 9/2004 Li ................................ 709/226

FOREIGN PATENT DOCUMENTS
JP  11-55321  2/1999
JP  11-66099  3/1999

* cited by examiner

Primary Examiner—Robert B. Harrell
(74) Attorney, Agent, or Firm—Staas & Halsey LLP

(57) ABSTRACT

In a distribution system for distributing contents (procedures or data) to a plurality of clients, there are provided a novel distribution system, distribution method, and program product therefor, by which the load on the parent server or the network connected with the parent server can be alleviated and automatic changeover of the distributing server in accordance with fluctuating distribution requests and alleviation of the load on the distribution system manager and users can be achieved. In a distribution system having a parent server 1 and a plurality of child servers 2, these being arranged to be capable of connection with a plurality of clients 3 through communication circuits, the parent server 1 selects a child server 2 that holds the contents whose distribution is requested and that is closest to a client 3 originating a distribution request by using the received position information of client 3 and identification information of the contents and communicates to the client 3 originating the distribution request, so that the selected child server 2 distributes the contents whose distribution is requested in response to the request from the client 3 originating the distribution request.

14 Claims, 13 Drawing Sheets

FIG. 3

| Server ID | Area ID | Weather forecast | ... | News viewer |
|---|---|---|---|---|
| TOKYO | Shutoken | Copied | ... | Copied |
| SHIZUOKA | Tokaido | Not copied | ... | Copied |
| NAGOYA | Chuochiku | Copied | ... | Not copied |

| Date/time | Client ID | Area ID | Contents ID | Result of access |
|---|---|---|---|---|
| 1999/11/22 11:22:33 | client000001 | Tokaido | News | OK |
| 1999/11/22 11:35:02 | client000005 | Kita tohoku | Weather forecast | OK |
| 1999/11/22 11:35:35 | client000001 | Tokaido | Weather viewer | OK |
| 1999/11/22 11:36:00 | client000002 | Hokuriku | Kanazawa map | OK |
| ...... | | | | |

Tokyo area

SYSTEM AND METHOD FOR DISTRIBUTING CONTENTS FROM A CHILD SERVER BASED ON A CLIENT'S CURRENT LOCATION

CROSS-REFERENCE TO RELATED APPLICATIONS

This application claims the benefit of Japanese Patent Application No. 2000-138536 filed May 11, 2000, in the Japanese Patent Office, the disclosure of which is incorporated herein by reference.

BACKGROUND OF THE INVENTION

1. Field of the Invention

The present invention relates to a distribution system for distributing procedures (application programs etc) and/or data (jointly referred to as "contents") to a plurality of clients such as clients present over a wide area and/or clients provided in mobile units. In particular, it relates to a distribution system whereby efficient distribution can be performed which is adapted to dynamic changes in demand for the procedures or data, by utilizing distribution technology such as the Internet.

2. Description of the Related Art

Conventionally, distribution systems whereby procedures or data are distributed to a plurality of clients are utilized, for example, when product catalogues or inventory information etc are distributed to sales companies or small retailers worldwide, or when an information provider distributes programs or data for the provision of services to a large number of members, or when data such as map information or weather information or viewer programs for the data are distributed to vehicle-mounted/mobile information terminals.

FIG. 19 is a layout diagram showing an example of a conventional distribution system. A distribution server 1 (parent server) is a server constituting the distribution source for procedures and/or data, and a plurality of clients 3 constitute the distribution destinations of the procedures and/or data. In this case, a single distribution server 1 distributes the requested procedures or data in response to requests from all the clients 3. Such a distribution mode is frequently employed by an information provider when providing a distribution service for procedures or data using the Internet.

FIG. 20 is a layout diagram illustrating another example of a prior art distribution system. The distribution system shown in FIG. 20 attempts to disperse the load on the parent server 1 and the network connected to parent server 1 by dividing the distribution destinations for the procedures or data into a plurality of areas, and providing one or a plurality of child servers 2 for each area. In this distribution mode, a client 3 is associated with a specific area, and receives distribution of procedures or data specific to this area from the child server 2 that is responsible for this area. Also, procedures or data that are common to all areas are directly supplied from parent server 1. Such distribution systems are utilized by information providers that distribute procedures or data on a world scale, and by enterprises having a large number of clients 3 on a national/world scale.

However, with the conventional distribution system shown in FIG. 19, since, as described above, a single distribution server 1 performs distribution of procedures or data to all the clients 3, if there are a large number of simultaneous distribution requests, the load on the distribution server and/or network is increased, giving rise to a problem that in some cases a condition may be produced in which the server or network become unusable.

Furthermore, in the case of the distribution system shown in FIG. 20, although, as mentioned above, this has a configuration whereby the load on the parent server 1 and the network connected to the parent server 1 is dispersed, when a large number of distribution requests to parent server 1 are generated simultaneously, in order to prevent this from resulting in a load concentration, on each occasion, it is necessary to perform an operation to change the distribution source from a parent server 1 to a child server 2 that is closest to the client 3. Although, in order to render such an operation unnecessary, means may be adopted whereby the parent server 1 and all of the child servers 2 are provided with all of the procedures or data that are to be distributed, a problem results that storage equipment having a large capacity must be provided at each of the child servers 2, since even procedures or data in which the frequency of use (distribution requests) is extremely low have to be stored therein.

SUMMARY OF THE INVENTION

Accordingly, in a distribution system whereby procedures or data are distributed to a plurality of clients, an object of the present invention is to provide a distribution system, distribution method, and program product therefor whereby the load on the parent server or the network connected with the parent server can be alleviated and automatic changeover of the distributing server in accordance with fluctuating distribution requests and alleviation of the load on the distribution system manager and users can be achieved.

In order to achieve the foregoing object, according to one aspect of the present invention, in a distribution system having a parent server and a plurality of child servers, arranged to be capable of connection with a plurality of clients through communication circuits, the parent server uses the received client position information and contents identification information to select the child server that is closest to the client that originated the distribution request and that holds the contents requested for distribution, and communicates this to the client that originated the distribution request, whereupon the selected child server distributes the contents that were requested for distribution in response to a request from the client that originated the distribution request. Consequently, according to an aspect of the present invention, the amount of information transfer between the clients and the parent server is reduced, and the load on the parent server and the network connected to the parent server can be alleviated. Also, since the distribution source is automatically changed over to the child server that is closest to the client, the load on the manager and users of the distribution system can be alleviated.

In order to achieve the above object, according to a further aspect of the present invention, a distribution system having a parent server and a plurality of child servers is provided, being arranged to be capable of connection with a plurality of clients through communication circuits, so that contents held by the parent server and/or the child servers are distributed to the clients. The parent server includes a unit that receives position information of the clients and identification Ad information of the contents whose distribution is requested by the clients, and an unit that selects the child server which holds the contents whose distribution is requested and which is closest to the client that originates the distribution request, using the received client position information and identification of the contents, and that notifies the client that originates the distribution request of the position information of the selected child server. The child server includes a unit that distributes the contents whose distribution is requested in response to a request of the client originating the distribution request.

Furthermore, according to the invention, in a preferred embodiment, the parent server includes a unit that ascertains the presence or absence of a distribution request or the frequency of distribution requests for said contents from said clients situated in an area for which said child server is responsible. The child server includes a unit that acquires and copies from the parent server the contents that are not held by the child server, on the basis of the ascertained presence or absence of a distribution request or the frequency of distribution requests.

Furthermore, according to the invention, in a preferred embodiment, the child server includes a unit that ascertains the presence or absence of a distribution request or the frequency of distribution requests for said contents from the clients situated in the area for which the child server is responsible, and an unit that deletes from the child server the contents which are held by the child server on the basis of the ascertained presence or absence of a distribution request or the frequency of distribution requests.

Furthermore, according to the invention, in another embodiment, the child server includes a unit that deletes from the child server said contents which are held by said child server on the basis of the presence or absence of a distribution request or the frequency of distribution requests ascertained by said parent server.

According to a further aspect of the present invention, a distribution system having a parent server and a plurality of child servers is provided arranged to be capable of connection with a plurality of clients through communication circuits, so that contents held by the parent server and/or the child servers are distributed to the clients. The parent server includes a unit that ascertains the presence or absence of a distribution request or the frequency of distribution requests for the contents from the clients situated in an area for which the child server is responsible, and the child server includes a unit that acquires and copies from the parent server the contents which are not held by the child server on the basis of the ascertained presence or absence of a distribution request or the frequency of distribution requests.

Furthermore, according to the invention, in a preferred embodiment, the child server includes a unit that ascertains the presence or absence of a distribution request or the frequency of distribution requests for the contents from the clients situated in the area for which the child server is responsible, and a unit that deletes from the child server the contents which are held by the child server on the basis of the ascertained presence or absence of a distribution request or the frequency of distribution requests.

Furthermore, according to the invention, in another embodiment, the child server includes a unit that deletes from the child server the contents which are held by the child server on the basis of the presence or absence of a distribution request or the frequency of distribution requests ascertained by the parent server.

According to a further aspect of the present invention, a computer program product operates on a parent server in a distribution system having the parent server and a plurality of child servers, being arranged to be capable of connection with a plurality of clients through communication circuits, so that contents held by the parent server and/or the child servers are distributed to the clients. The computer program product includes selecting the child server that holds the contents whose distribution is requested and that is closest to the client that made the distribution request on the basis of position information of the client that makes a distribution request for the contents and identification information of the contents whose distribution is requested by the client, and communicating the position information of the selected child server to the client that makes the distribution request.

According to a further aspect of the present invention, a computer program product operates on a parent server in a distribution system having the parent server and a plurality of child servers, being arranged to be capable of connection with a plurality of clients through communication circuits, so that the contents held by the parent server and/or the child servers are distributed to the clients. The computer program product includes ascertaining the presence or absence of a distribution request or the frequency of distribution requests in respect of the contents from the clients situated within an area for which the child server is responsible, and giving the child server notification to prompt copying to the child server from the parent server of the contents that are not held by the child server, or deleting from the child server the contents that are held by the child server, on the basis of the ascertained presence or absence of a distribution request or the frequency of distribution requests.

According to a further aspect of the present invention, a computer program product that operates on a child server in a distribution system having a parent server and a plurality of child servers, being arranged to be capable of connection with a plurality of clients through communication circuits, so that the contents held by the parent server and/or the child servers are distributed to the clients. The computer program product includes program code which copies to the child server from the parent server the contents that are not held by the child server, or deletes from the child server the contents that are held by the child server, on the basis of presence or absence of a distribution request or frequency of distribution requests for the contents from the clients situated in an area for which the child server is responsible.

According to a further aspect of the present invention a method of distributing contents to clients in a distribution system including a parent server and a plurality of child servers, being arranged to be capable of connection with the plurality of clients through communication circuits includes a parent server receiving identification information of the contents whose distribution is requested and position information of the client that makes a request for distribution of the contents. The method also includes the parent server selecting, on the basis of the received position information of the client and contents identification information, the child server which has the contents that is requested for distribution and which is closest to the client that makes the request for distribution, and notifies the client that makes the request for distribution of the position information of the selected child server; and a step in which the selected child server distributes the contents whose distribution is requested in response to a request of the client that makes the distribution request.

According to a further aspect of the present invention, a method of distributing contents to clients in a distribution system including a parent server and a plurality of child servers, being arranged to be capable of connection with the plurality of clients through communication circuits, including a step of ascertaining the presence or absence of a distribution request or the frequency of distribution requests in respect of the contents from the clients situated in an area for which the child server is responsible. The method also includes a step of copying the contents which are not held on the child server from the parent server to the child server, or deleting the contents which are held on the child server from the child server on the basis of the ascertained presence or absence of a distribution request or the frequency of distribution requests, and a step of performing distribution from the child server in response to a distribution request for contents held by the child server from the clients situated in the area for which the child server is responsible.

According to a further aspect of the present invention, a distribution system is provided including a parent server, a plurality of child servers and a plurality of clients which are connected through communication circuits so that contents held by the parent server and/or the child servers are distributed to the clients. The clients communicate to the parent server position information of the clients and identification information of the contents whose distribution is requested by the clients, the parent server selects, on the bases of the position information of the client and the contents identification information that is communicated thereto, the child server that holds the contents whose distribution is requested and that is closest to the client that originates the distribution request, and communicates the position information of the selected child server to the client originating the distribution request, and the client that originates the distribution request receives the contents whose distribution is requested from the selected child server, on the basis of the position information of the selected child server.

Furthermore, according to the invention, in a preferred embodiment, receipt performed by the client of contents from the selected child server is conducted using a program downloaded to said client from the parent server when the request for distribution of the contents is made.

Further objects and features of the present invention will be apparent from the embodiments of the invention described below.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a view showing an example of location information;

FIG. 4 is a view showing an example of an access log;

DESCRIPTION OF THE PREFERRED EMBODIMENTS

Figure 1:
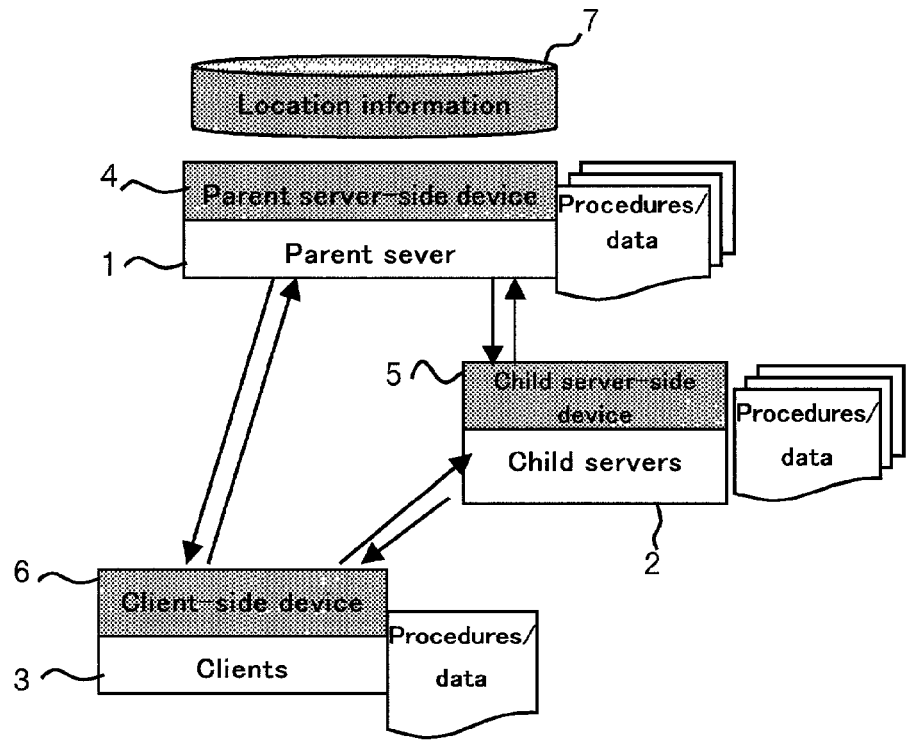
FIG. 1 is a schematic layout diagram of a distribution system to which an aspect of the present invention is applied.

Embodiments of the present invention are described below with reference to the drawings. However, the technical scope of the present invention is not restricted by these embodiments. Identical or similar items in the drawings are given the same reference numerals or reference symbols in the description.

FIG. 1 is a schematic layout diagram of a distribution system to which the present invention has been applied. The distribution system includes a parent server 1, child servers 2, clients 3 and parent server-side device 4, child server-side devices 5, and client-side devices 6. Parent server 1, child servers 2, and clients 3 are constituted by computer systems, etc. and are respectively connected through communication circuits. A parent server-side device 4, child server-side device 5 and client-side device 6 are preferably constituted by software (a program). The software constituting the client-side device 6 is previously installed on a client 3, or, if necessary (when there is a distribution request etc), is downloaded from the parent server 1 to the client 3.

Parent server 1 stores and manages procedures and data that are common to all distribution ranges and distributes the procedures and data to the child servers 2 or clients 3 in accordance with requirements. Child servers 2 are servers that distribute procedures or data to clients 3 belonging/within the area for which the child servers are responsible. One or more child servers is provided for each area. The "areas" are respective ranges into which the entire range of distribution is geographically or logically divided. The clients 3 are the distribution destinations of the procedures or data; a plurality of clients may be present in a distribution range.

Location information 7 is child server information indicating the whereabouts of the procedure or data. Using this information, the parent server-side device 4 notifies the client 3 of the identity of the child server which is the distribution source for the requested procedures or data and, if necessary, copies the procedure or data to the child server 2. Also, child server-side device 5, in co-ordination with parent server-side device 4, copies and registers the necessary procedures or data to the child server 2 and deletes procedures or data which are no longer required from child server 2. Client-side device 6 automatically changes over the server from which receives the distribution in accordance with information communicated to it from parent server-side device 4.

Procedures or data which are the subject of distribution are herein labeled "contents." Contents that which are common to the entire distribution region and are managed by parent server 1 are called "global contents", while contents which are peculiar to each individual area and are held on each child server 2 are called "local contents."

Also, although, in FIG. 1, contents distribution is performed with a two-level arrangement, a three-level arrangement could be adopted. In this case, the arrangement is adopted that the areas covered by child servers 2 are further divided into a plurality of sub-areas, grandchild servers being provided which are responsible for each sub-area, the original child servers 2 constituting parent servers in respect of these new grandchild servers. Three embodiments of distribution systems to which the present invention is applied will be described below for the case of two levels.

Figure 2:
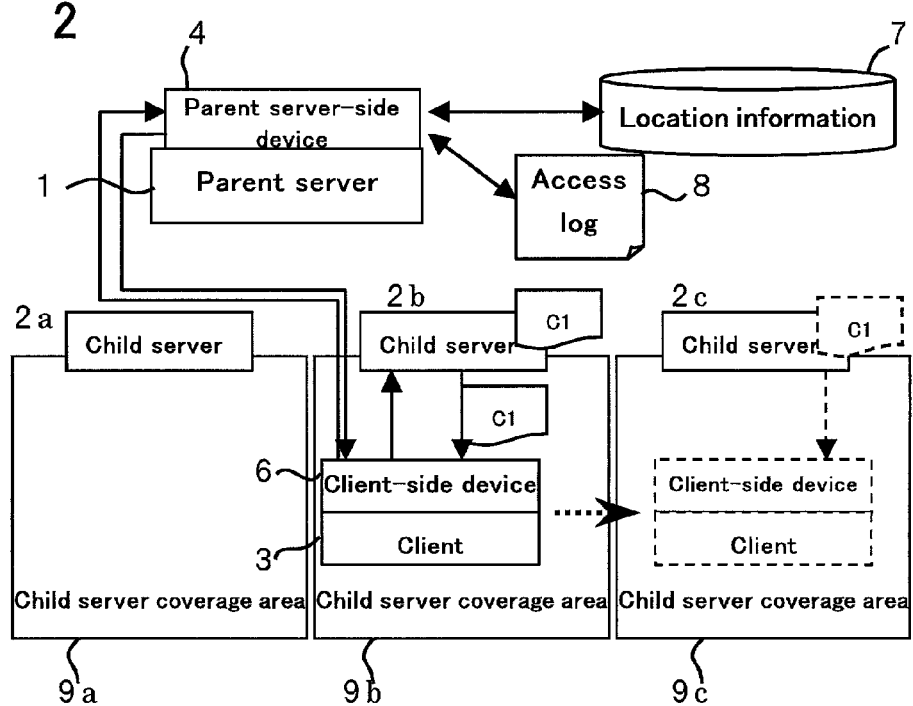
FIG. 2 is a layout diagram showing a first embodiment of a distribution system to which an aspect of the present invention is applied.

FIG. 2 is a layout diagram showing a first embodiment of a distribution system to which the present invention has been applied. In the distribution system of this embodiment, the position of the closest child server 2 having the contents whose distribution is requested is notified from parent server-side device 4, and the client-side device 6 acquires these contents from the closest child server 2, as a result, automatically changeover of the distribution source of the contents to client 3 is achieved.

As described with reference to FIG. 1, the distribution system shown in FIG. 2 is arranged in two layers comprising a parent server 1, child servers 2, and clients 3, and distributes contents to clients 3 from the parent server 1 or the child servers 2. Three child servers 2a, 2b, 2c are shown by way of example in FIG. 2. The ranges for which these respective child servers are responsible are child server coverage areas 9a, 9b and 9c in FIG. 2.

The location information 7 that is prepared at the parent server side is information indicating in which of the child servers 2 the contents (global contents) that are managed by parent server 1 are stored (copied); an example thereof is shown in FIG. 3. This example is a case in which a single child server 2 is responsible for a single area. The server ID and area ID indicate the identifier of the child server 2 and the child server coverage area 9 corresponding to the respective child server 2. Also, the title of the contents is indicated in section a in FIG. 3, and what contents have been copied from parent server 1 to each child server 2 is indicated in section b. The method of implementation may be adopted that the information of this section b is represented in bit form, and the information as to what global contents are provided at a child server 2 is represented by a single integer.

Also, the access log 8 in FIG. 2 is a log of distribution request access from client 3 to parent server 1; an example thereof is shown in FIG. 4. As shown in FIG. 4, information such as the access date/time, the client ID, the area ID of the area to which the client 3 belongs, and the contents ID of the contents whose distribution was requested, and result of access, for example, are shown in time sequence in access log 8. This access log 8 is employed for calculation of the frequency of access, as will be described, and may contain the minimum necessary information for this purpose.

Next, client-side device 6 makes a request to the parent server 1 for a distribution of contents and accepts the requested contents; client-side device 6 may be constantly actuated at client 3, or may be actuated when required by the user of client 3. If it is constituted by software, as described above, it may be installed beforehand on client 3, or may be downloaded from parent server 1 when a distribution request is made. When a distribution request is made, client-side device 6 sends to parent server-side device 4 information such as the contents ID for uniquely determining the contents whose distribution is requested, and information such as the area ID identifying the area in which the client 3 is currently located. The desired contents are then acquired from child server 2 by utilizing the location information of the contents (i.e. the position of the closest child server 2 which has the contents in question) which is communicated in reply thereto from parent server-side device 4.

Parent server-side device 4 extracts from location information 7 information as to the identities of the child servers 2 on which the contents requested from client-side device 6 are present (have been copied), and, using the information of area 9 sent from client-side device 6, selects from these the closest child server 2 to the client 3 in question, and returns this position information to client 3. Also, the identity of the area 9 and the identity of the client 3 thereof from which the request was made and the identity of the requested item of contents are logged in access log 8. Parent server-side device 4 operates continuously at parent server 1.

Figure 5:
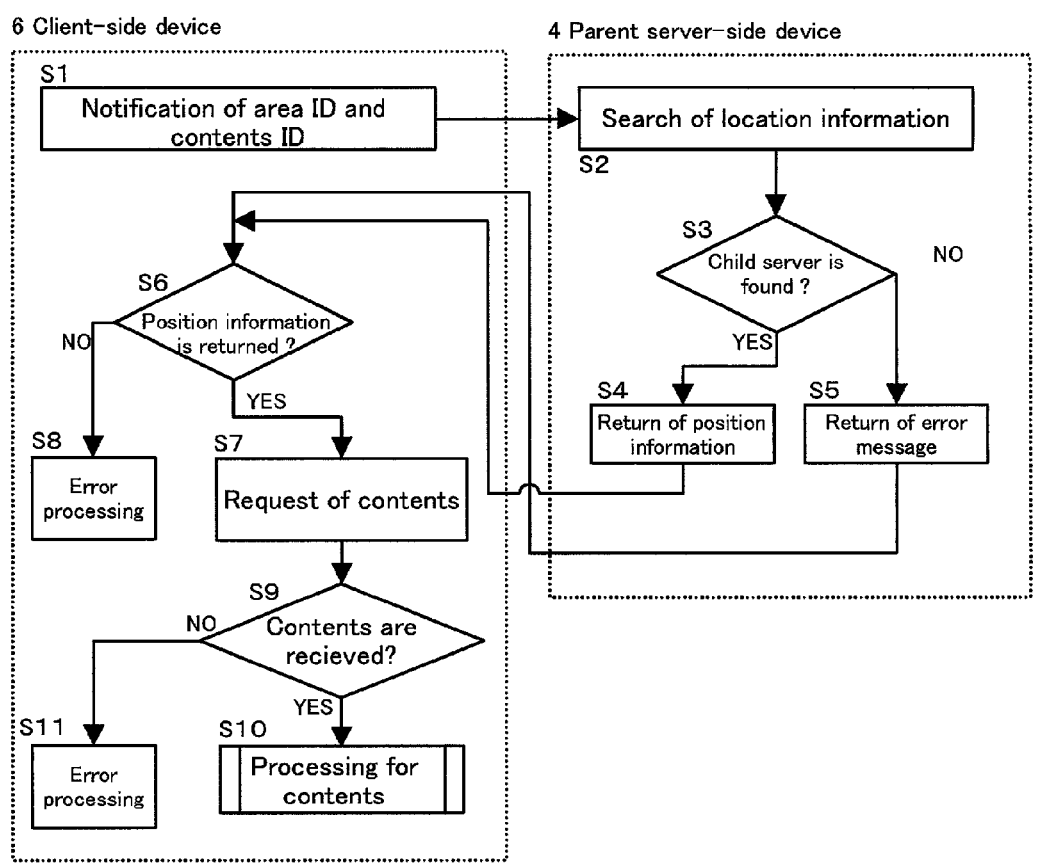
FIG. 5 is a flowchart showing the operation of a distribution system according to a first embodiment.

FIG. 5 is a flowchart illustrating the operation of the distribution system according to the first embodiment. The operation when a client 3 requests distribution of global contents C1 will now be described with reference to FIG. 2 and FIG. 5. As shown in FIG. 2, client 3 is situated in area 9b that is covered by child server 2b. First, client-side device 6 notifies parent server-side device 4 of information uniquely identifying area 9b and contents C1 (step S1 of FIG. 5). Using these items of information, parent server-side device 4 then searches location information 7 to ascertain the identity of child server 2 on which the requested contents C1 are present (step S2 of FIG. 5).

Next, from the results of this search and the information regarding the aforementioned area 9b that has been sent, the closest child server 2 to the client 3 which made the request having the contents C1 is selected, and its position information (for example URL) is returned (step S3 and S4 in FIG. 5). If the child server 2b that covers the area 9b in which the requesting client 3 is situated has contents C1, the position information of child server 2b is sent; if it does not have these contents, the position information of the child server, for example child server 2c which is closest to area 9b is sent. Also, if the result of the search is that no server is found which has the requested contents C1, an error message is returned (step S5 of FIG. 5).

When client-side device 6 receives the position information, it uses this position information to make a request for distribution to the closest child server 2 having contents C1, and receives distribution of contents C1 (steps S6, S7 and S9 in FIG. 5). As described above, if child server 2b has contents C1, distribution is received from child server 2b; if not, distribution is received from the closest child server, for example child server 2c. Also, if child server 2b that covers the area 9b in which the requesting client 3 is situated does not have the desired contents C1, it may be arranged for contents C1 to be distributed from parent server 1.

As shown in FIG. 2, even if the request is made when the requesting client 3 moves (is transferred) and is situated in child server coverage area 9c, the same action as described above is performed, with the result that the requesting client 3 receives contents distribution from child server 2c if child server 2c has contents C1 or, if not, receives contents distribution either from the closest child server 2 (for example child server 2b) or from parent server 1.

It should be noted that it could be arranged for the client-side device 6 to make a distribution request directly to this child server 2b if it is found that child server 2b that covers this area 9b has the desired contents C1 or if distribution of local contents specific to this area 9b is received.

Figure 6:
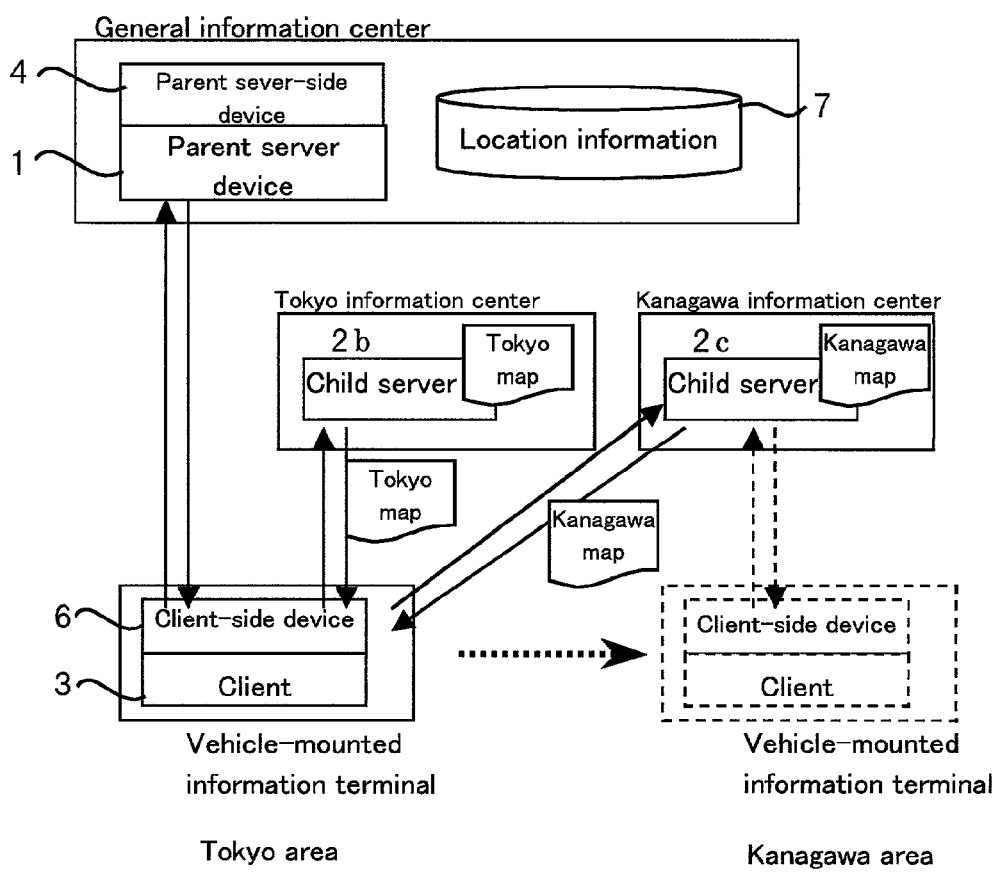
FIG. 6 is a view showing a practical example of a distribution system according to the first embodiment.

FIG. 6 is a view showing a practical example of a distribution system according to the first embodiment. In this practical example, client 3 is a vehicle-mounted information terminal that receives distribution of map information (MAP) from a server, the MAP being utilized by displaying it on a map viewer.

A General Information Center is positioned as parent server 1 in which all the map information is provided, the server being the distribution source of the map information. The Tokyo Information Center and Kanagawa Information Center shown in the drawing are examples of child servers associated with General Information Centers that cover respectively the Tokyo area and Kanagawa area and are positioned as child servers 2b, 2c. Also, in this example, it is assumed that client 3 (vehicle-mounted information terminal) is in the course of movement from the Tokyo area to the Kanagawa area in order to participate in an event that is being performed in the Kanagawa area.

First, client 3 makes a request to the General Information Center for distribution of map information (Tokyo MAP) of the Tokyo area in which it is currently situated. At this point, the information of the area where client 3 is situated is generated using its current position obtained from for example a Global Positioning System (GPS) receiver. The position information (URL) of the Tokyo Information Center (child server 2b) having the Tokyo MAP is returned by executing an operation as described above at parent server 1, which is the General Information Center. Client-side device 6 thereby receives distribution of the Tokyo MAP from the Tokyo Information Center.

Also, if it is desired to view beforehand while in the Tokyo area the map information of the Kanagawa area (Kanagawa MAP) which is the destination, since the Tokyo Information Center of the area in which the client 3 is situated does not have a Kanagawa MAP, the position information of the closest Kanagawa Information Center (child server 2c) is returned, and, using this, distribution thereof is received from the Kanagawa Information Center. On the other hand, when client 3 moves, at the stage where the client enters the Kanagawa area, a distribution request for the Kanagawa MAP is made, producing a configuration in which distribution is received from child server 2c (Kanagawa Information Center) that covers this area.

As described above, since, with a distribution system according to the first embodiment, the communication between the parent server 1 and client 3 consists merely of an inquiry for the position information as to the identity of a child server 2 from which the desired contents distribution can be received, the amount of information to be transferred can be greatly reduced compared with the conventional method. Also, since the child server 2 constituting the distribution source is automatically changed in accordance with the location where the client 3 is situated, there is no need for action by the user of client 3 or the server manager to change over the distributing server.

Figure 7:
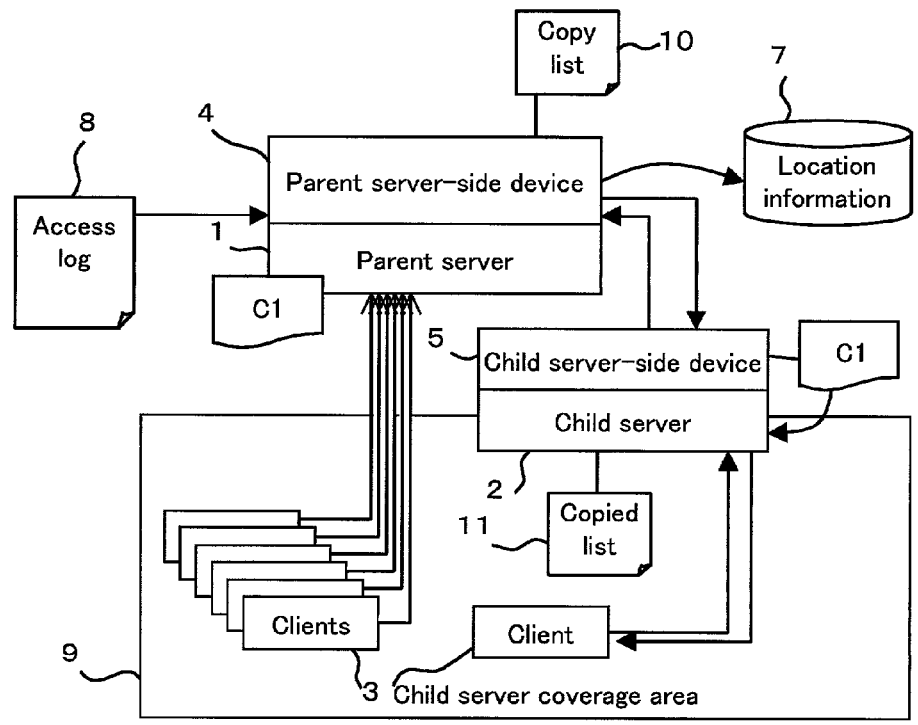
FIG. 7 is a distribution system layout diagram according to a second embodiment.

Next, a second embodiment of a distribution system employing the present invention will be described. FIG. 7 is a layout diagram of a distribution system according to the second embodiment. In this distribution system, if the child server of the area 9 in which the client 3 constituting the distribution destination is situated does not have the contents to be distributed, these contents are automatically copied from parent server 1 to this server 2 so that they can be distributed from this child server 2 to client 3.

As shown in FIG. 7, in the distribution system of this embodiment, just as illustrated in FIG. 1 and FIG. 2, a two-layer distribution arrangement is provided comprising a parent server 1, child servers 2 and clients 3. Child server coverage area 9 is the range of distribution for which child server 2 is responsible. Location information 7 and access log 8 have the same content as described above with reference to the first embodiment.

In this distribution system, parent server-side device 4 is constantly actuated at parent server 1 and analyses the access log 8 at fixed time intervals so as to ascertain the existence of distribution requests for the items of content (global) in each area (each child server 2). Also, if prescribed contents are copied to a prescribed child server 2, this fact is reflected in the location information 7.

Child server-side device 5 is constantly actuated on child server 2 and periodically accesses parent server-side device 4 to inquire as to the existence of contents distribution requests from the area 9 for which it is itself responsible. If there is a distribution request but the contents are not present, it copies the contents in question (for example C1 of FIG. 7) from parent server 1 and subsequently distributes these contents from child server 2 to client 3.

Figure 8:
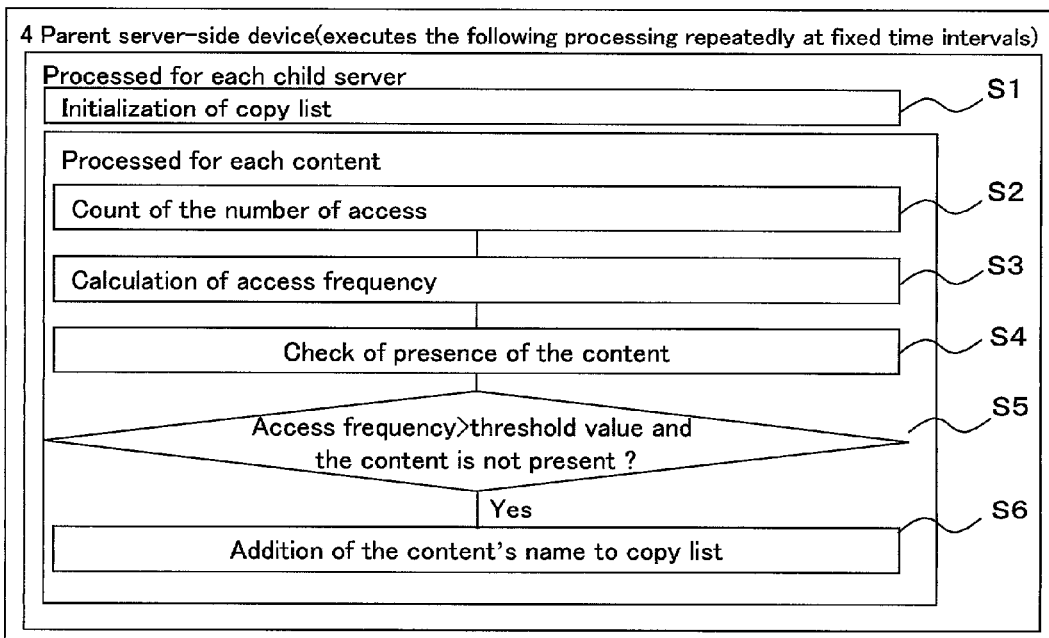
FIG. 8 is a flowchart showing the operation of a distribution system according to the second embodiment.
Figure 9:
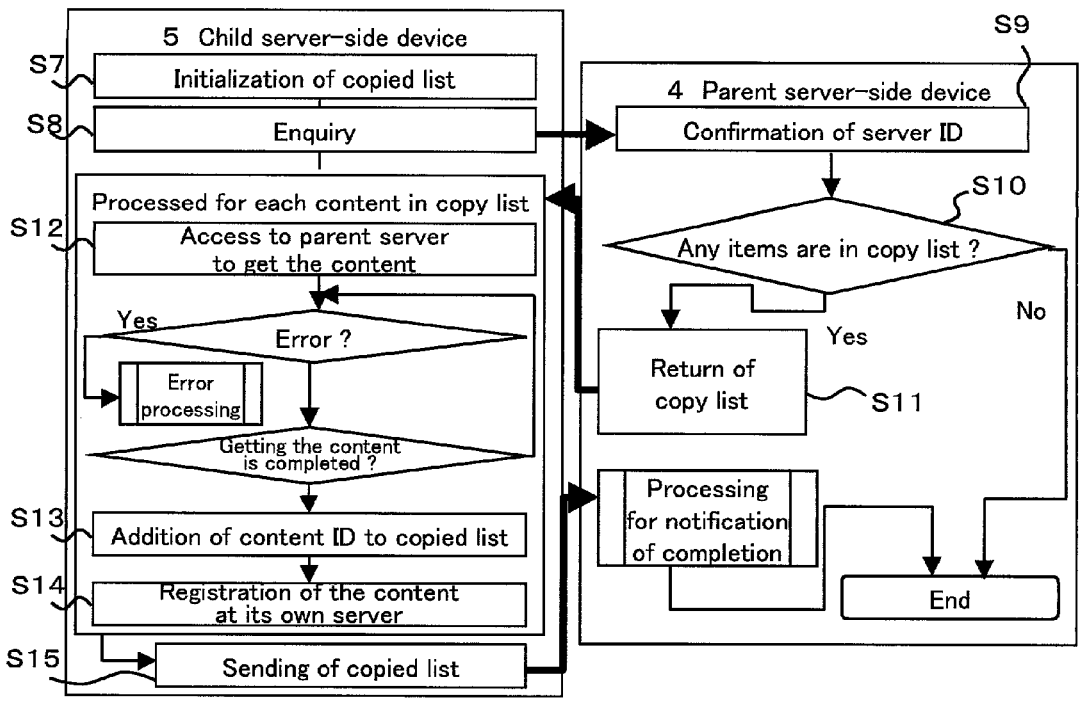
FIG. 9 is a flowchart showing the operation of a distribution system according to the second embodiment.
Figure 10:
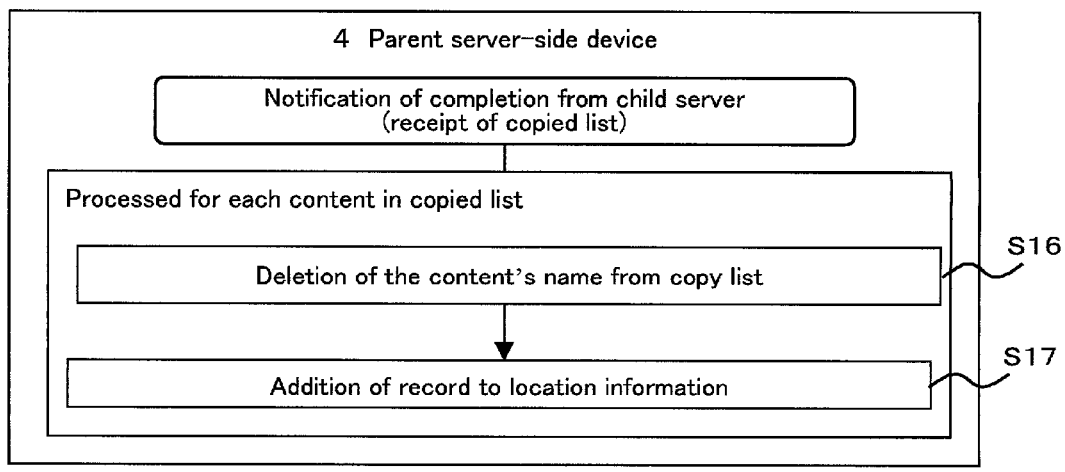
FIG. 10 is a flowchart showing the operation of a distribution system according to the second embodiment.

FIG. 8, FIG. 9 and FIG. 10 are flowcharts showing an example operation of a distribution system according to the second embodiment. The operation of this distribution system is described below with reference to these FIGS. 7–10. First, as shown in FIG. 8, processing to compile a copy list 10 is executed at the side of parent server 1. Parent server-side device 4 repeatedly executes the following processing in respect of each child server 2 at fixed time intervals. First, it initializes the copy list 10 in respect of a child server 2 that is the subject of processing (step S1 of FIG. 8). "Copy list" 10 indicates a list of the contents to be copied to the server 2 in question.

Next, the following processing is repeatedly executed for each item of contents held by the parent server 1. First, from access log 8, it counts the number of accesses constituting distribution requests in respect of the contents in question from within area 9 for which the child server 2 in question is responsible (step S2 in FIG. 8). Next, it calculates the access frequency from these access numbers (step S3 in FIG. 8). For the calculation of access frequency, the method may be adopted, for example, of dividing the number of accesses by the time over which the log is compiled.

Next, it searches the location information 7 to ascertain whether the contents in question are currently present on child server 2 in question (step S4 in FIG. 8). If, as a result, it finds that these contents are not present, and the access frequency is greater than a pre-set threshold value (step S5 in FIG. 8), it adds the name of the contents in question to the copy list 10 (step S6 in FIG. 8). It should be noted that, although, in the above description, the access frequency was employed for the decision regarding copying, it would be possible to make the decision to perform copying simply when the number of accesses exceeds a prescribed value (value of 1 or more). For example, if the aforementioned prescribed value is set as 1, if there is even a single request for distribution, a decision to effect copying on to child server 2 is made.

A copy list 10 is generated for child server 2 in question by executing processing as above for each item of contents. Such copied lists 10 are respectively generated for all the child servers 2.

Next, an inquiry is made from the side of the child server 2 as to whether any distribution requests have been made to parent server 1. FIG. 9 shows the operation of child server-side device 5 and parent server-side device 4 at this point. First, child server-side device 5 periodically initializes copied list 11 (step S7 of FIG. 9) and inquires of the parent server-side device 4 whether there have been any contents distribution requests from the area 9 for which it is itself responsible (step S8 in FIG. 9). The "copied list" 11 is a list of the items of contents that have been copied to child server 2 in question.

After confirming the identity of the child server 2 making the request (step S9 in FIG. 9), the parent server-side device 4 that is in receipt of this request ascertains whether there are any items of contents which should be copied to the corresponding copy list 10 (step S10 in FIG. 9). If there are items of contents that should be copied, it returns the copy list 10 to the child server 2 in question (step S11 in FIG. 9). It should be noted that various methods of implementing the returned copy list 10 may be employed, such as implementation in the form of a set of flags, each flag of which indicates whether each item of contents is to be copied or not respectively.

When child server-side device 5 has received the copy list 10, it fetches the items of contents included therein from parent server 1 (step S12 of FIG. 9), and adds their names to the copied list 11 (step S13 in FIG. 9), and registers these items of contents at its own server (child server 2) (step S14 in FIG. 9). At the time-point where the above processing has been completed, the copied list 11 is sent to parent server-side device 4 (step S15 in FIG. 9), thereby giving notification that the contents in question have become capable of distribution also at the side of child server 2. Just as in the case of the copy list 10 described above, a method of implementation such as implementation in the form of a set of flags may be adopted for this copied list 11 also. Also, the notification to parent server-side device 4 may be effected every time registration of each item of contents on to child server 2 is completed.

For each item of contents included in the copied list 11, the parent server-side device 4, after it has received the notification, deletes the name of the contents in question from the copy list 10 of the child server 2 in question (step S16 of FIG. 10) and, in addition, makes a record in location information 7 to the effect that the item of contents in question has become capable of being distributed by the child server 2 in question (step S17 in FIG. 10). The item of contents in question can thereafter be distributed from child server 2.

Although, in the above description, a method was described wherein inquiry was made periodically from the side of child server 2, according to another aspect of the present invention a method can also be adopted wherein copying of contents is prompted by accessing child server 2 periodically from the side of parent server 1, in combination with the generation of copy list 10 at parent server-side device 4 described with reference to FIG. 8.

Figure 11:
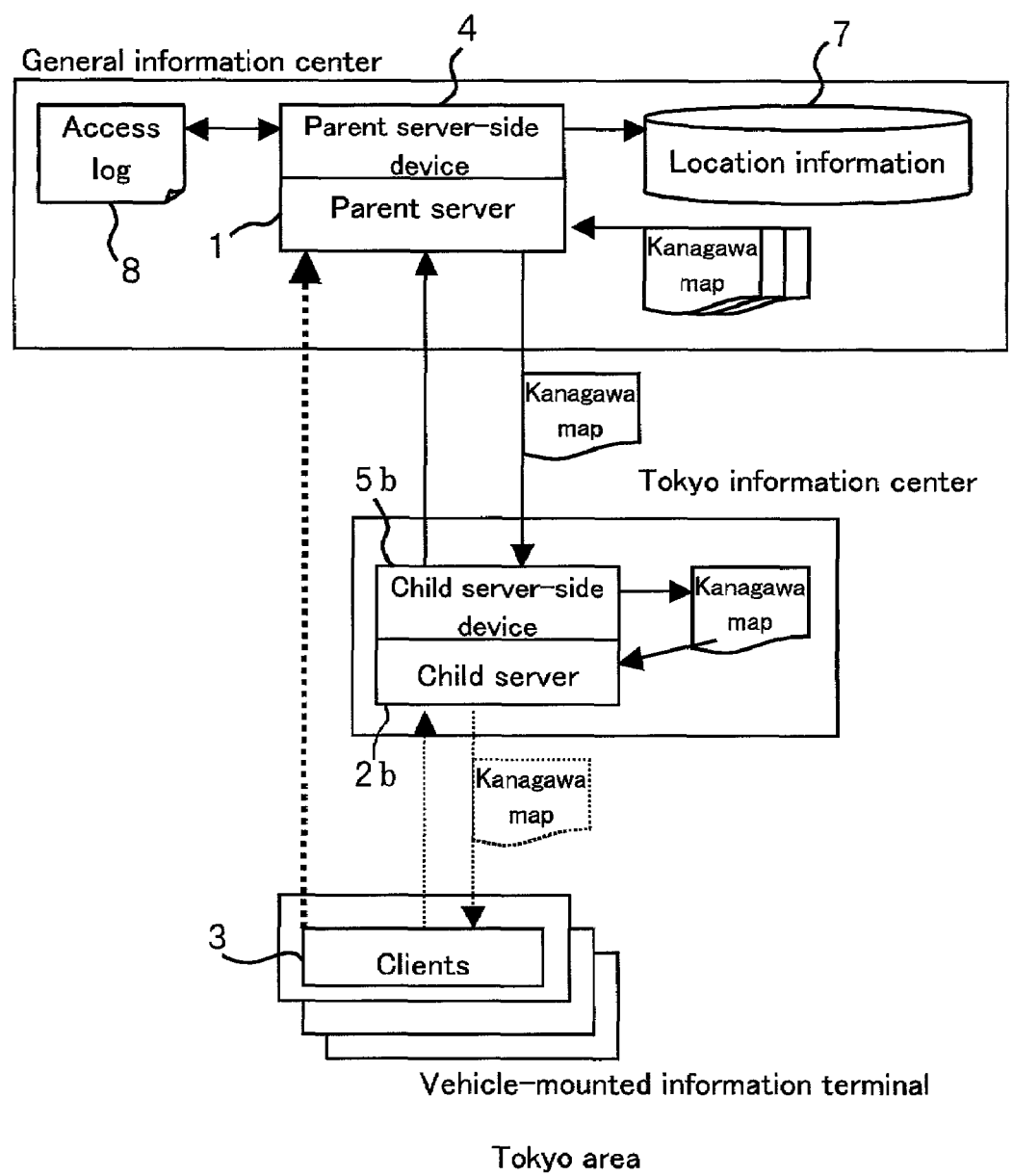
FIG. 11 is a view showing a practical example of a distribution system according to the second embodiment.

FIG. 11 is a view showing a practical example of a distribution system according to the second embodiment. In this practical example, the same scenario is assumed as in the case of the practical example described with reference to FIG. 6. As described above, client 3 includes a vehicle-mounted information terminal in the course of traveling from the Tokyo area for participation in an event held in the Kanagawa area. Also, it will be assumed that there are a large number of participants in this event from the Tokyo area, with the result that requests to parent server 1 for distribution of the Kanagawa MAP increase.

In this case, when generation of a copy list 10 in respect of the Tokyo Information Center (child server 2b) is performed at parent server-side device 4, this Kanagawa MAP is listed. In the event of an inquiry from child server-side device 5, the Kanagawa MAP is also copied and registered at the Tokyo Information Center (child server 2b). Since a statement to this effect is recorded in the location information 7 of parent server 1, it is made possible to carry out distribution from the Tokyo Information Center (child server 2b) in response to any subsequent request for distribution of the Kanagawa MAP from the Tokyo area.

In this way, buffering of load concentration onto parent server 1 and child server 2c of the Kanagawa area having the Kanagawa MAP can be achieved; however, in cases where the participants in the event do not come just from the Tokyo area, a similar situation may occur in a plurality of other areas, so the benefit of employing the present distribution device thereby becomes even greater.

As described above, by the use of the distribution system according to the second embodiment, of the contents held by the parent server 1, those items of contents which have a high frequency of distribution requests are copied onto the child server 2 that is closest to the client 3 which originated this distribution. Distribution of contents to client 3 is performed from this location. Load concentrations on the parent server 1 and specified child servers 2 can thereby be dispersed and, since copying of contents for this purpose is performed automatically, the provision of time for this purpose is unnecessary. Also, since copying of contents to the required location is effected when necessary, there is no need to copy all the contents on to all of the child servers 2, making it possible to utilize resources efficiently.

It should be noted that it is possible to employ a distribution system according to this embodiment in combination with a system according to the first embodiment. Also, although the above description was given with reference to a two-layer distribution mode, an identical distribution system could be employed in a distribution mode with three or more layers. In this case, servers, which are in an arbitrary directly above/directly below relationship, operate positioned as the aforementioned parent server 1 and child servers 2, respectively.

Figure 12:
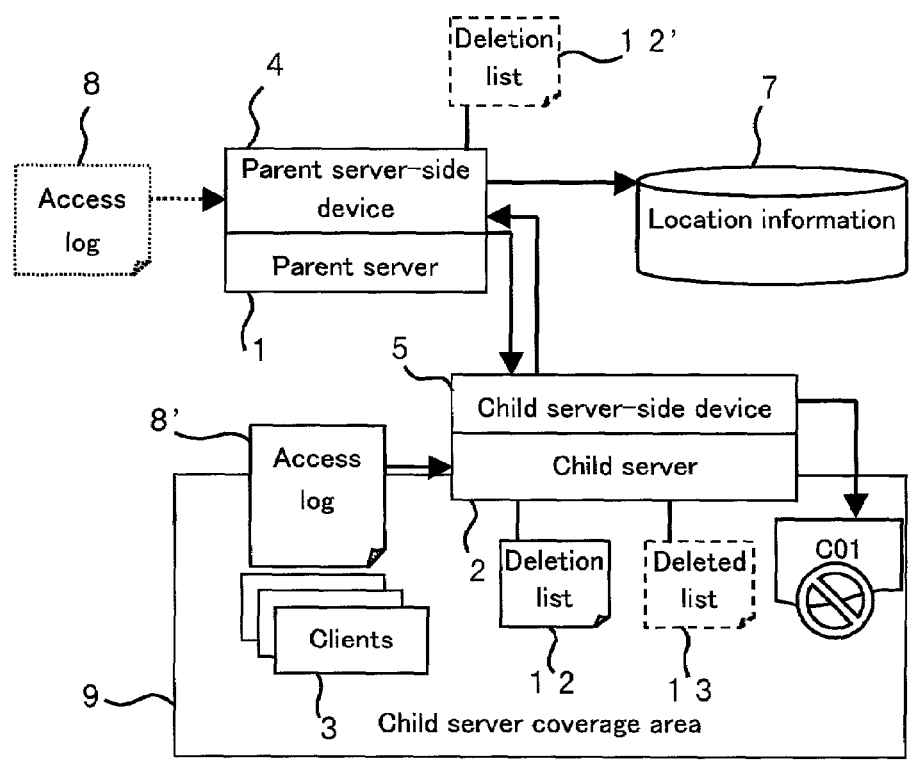
FIG. 12 is a layout diagram of a distribution system according to a third embodiment.

Next, a third embodiment of a distribution system to which the present invention has been applied will be described. FIG. 12 is a layout diagram of a distribution system according to the third embodiment. With this distribution system, contents in respect of which distribution requests from the associated area 9 have ceased or reduced can be automatically deleted from child server 2.

As shown in FIG. 12, a distribution system according to this embodiment, just as in the case of the first and second embodiments, has an example two-layer distribution structure comprising a parent server 1, child servers 2 and clients 3. Child server coverage area 9 is the distribution range for which the child server 2 is responsible. Location information 7 and access log 8 hold the same contents as described with reference to the first embodiment. Access log 8' is an access log at the side of child server 2, and the items logged are the same as in the case of the access log 8 at the side of parent server 1.

In this distribution system, child server-side device 5 is constantly actuated on child server 2 and checks for the existence of distribution requests in respect of each item of contents in the area 9 for which it is itself responsible by periodically checking access log 8'. Child server-side device 5 notifies server 1 of contents (for example C01 in FIG. 12) for which no distribution requests have been made or for which the frequency thereof is low. Parent server-side device 4 is continuously actuated on parent server 1, updates the location information 7 relating to contents that are to be deleted in accordance with the notification from the child server 2, and communicates completion of updating to the child server 2 in question. On receipt of this communication, child server-side device 5 deletes from the child server 2 in question contents for which no distribution requests have been made or for which the frequency thereof is low.

Figure 13:
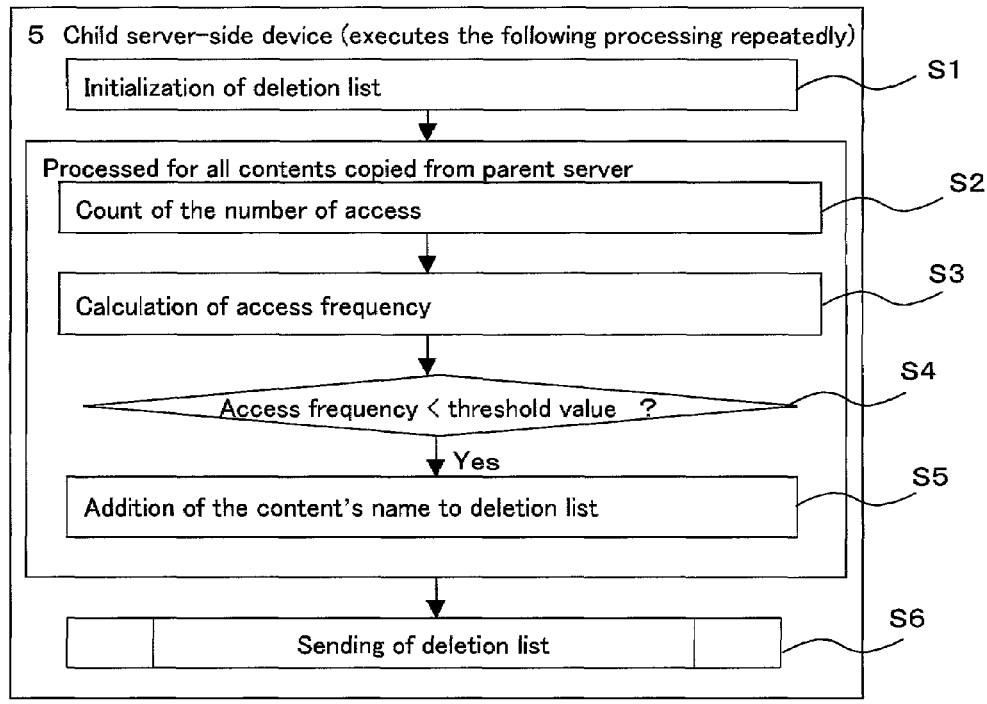
FIG. 13 is a flowchart showing the operation of a distribution system according to the third embodiment.
Figure 14:
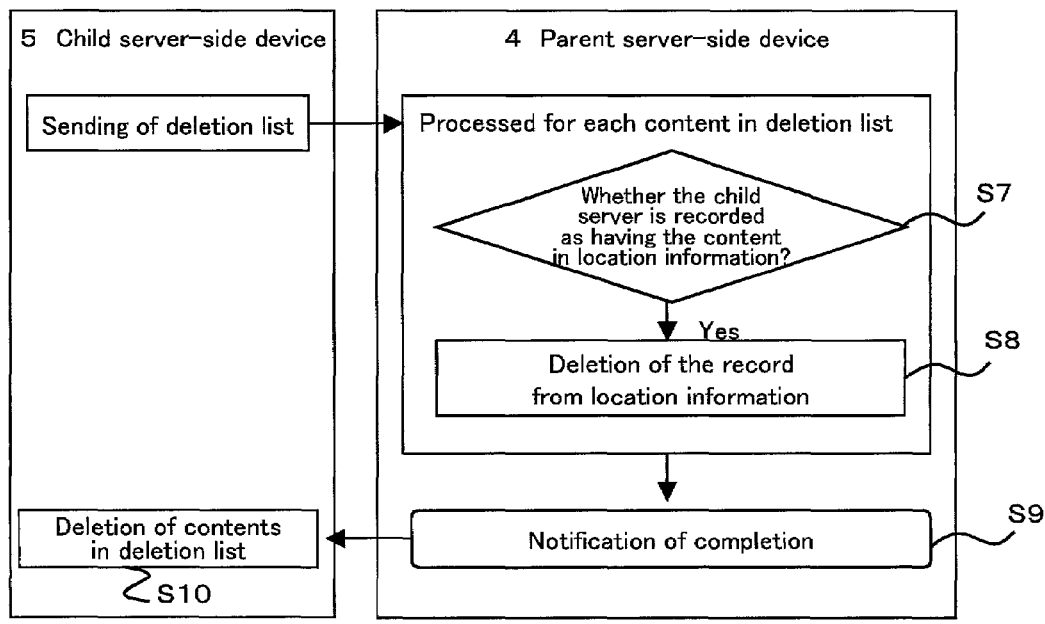
FIG. 14 is a flowchart showing the operation of a distribution system according to the third embodiment.

FIG. 13 and FIG. 14 are flowcharts illustrating the operation of a distribution system according to the third embodiment. The operation of this distribution system is described below with reference to these Figures and FIG. 12. First, child server-side device 5 initializes deletion list 12 at fixed time intervals. Deletion list 12 is a list of contents, of the (global) contents that are copied from the side of parent server 1, that are to be deleted (step S1 of FIG. 13). Next, respective processing is performed as follows in respect of all the contents copied from the side of parent server 1.

First, from access log 8', the number of accesses of the contents in question from within area 9 for which this child server 2 is responsible are counted (step S2 in FIG. 13). Next, by a method such as dividing this access number by the time for which the access log is compiled, the frequency of access is calculated (step S3 in FIG. 13). If this calculated access frequency is less than a previously set threshold value (step S4 in FIG. 13), a decision is made that this item of contents is to be deleted, and the name of this item of contents is added to the deletion list 12 (step S5 in FIG. 13). Although, in the above description, the decision for deletion was made using the access frequency, it would be possible to make a decision to perform deletion simply when the access number falls below a prescribed value. For example, if this prescribed value is set as 0, deletion of the item of contents in question from child server 2 will be performed if no distribution requests have been made.

When deletion list 12 has been generated by executing the above processing for all the items of contents, this is sent to parent server-side device 4 (step S6 in FIG. 13). The deletion list 12 that is transmitted may be implemented by a set of flags, each flag of which represents whether each item of contents is to be deleted or not respectively.

When parent server-side device 4 receives deletion list 12, it checks to see whether the child server 2 in question is recorded as having the item of contents in question in the location information 7 in respect of each of the items of contents therein (step S7 in FIG. 14), and if this is recorded, deletes the record (step S8 in FIG. 14). When updating of this location information 7 is completed, a message to the effect that the contents of deletion list 12 may be actually deleted is communicated to child server-side device 5 (step S9 of FIG. 14). Once child server-side device 5 has received this notification, it actually deletes the contents contained in the deletion list 12 from child server 2 (step S10 in FIG. 14).

Figure 15:
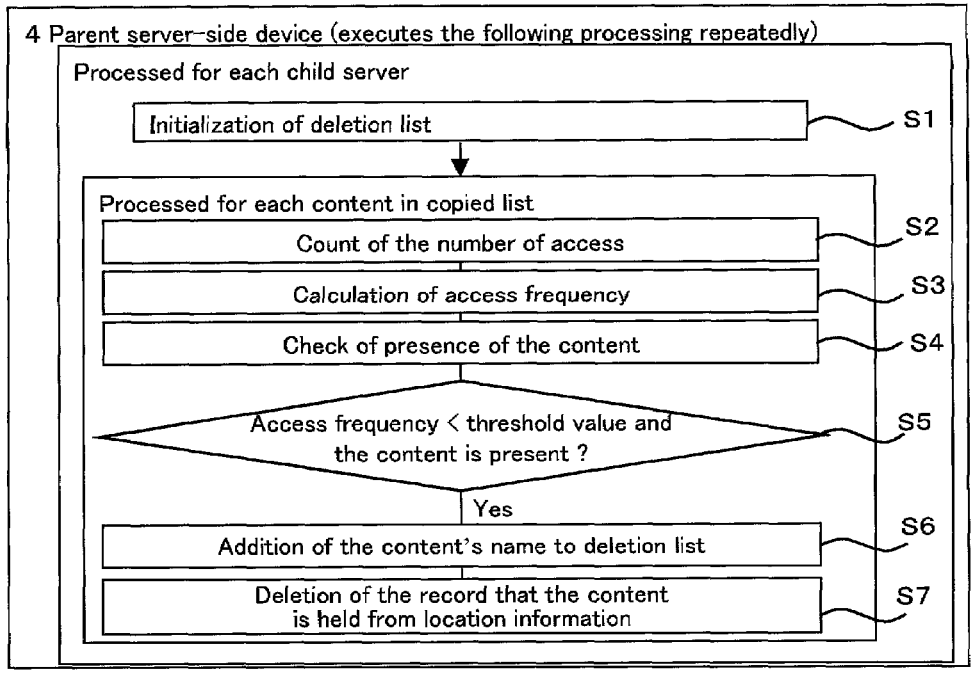
FIG. 15 is a flowchart of the case where a deletion list is generated at a parent server-side device according to the third embodiment.
Figure 16:
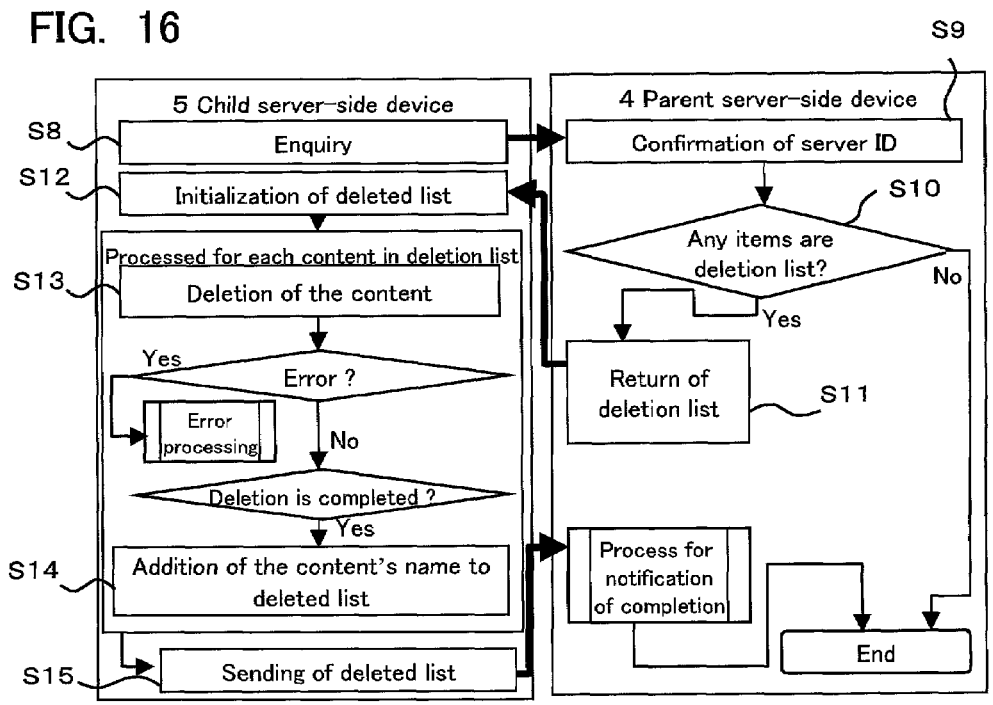
FIG. 16 is a flowchart of the case where a deletion list is generated at the parent server-side device according to the third embodiment.
Figure 17:
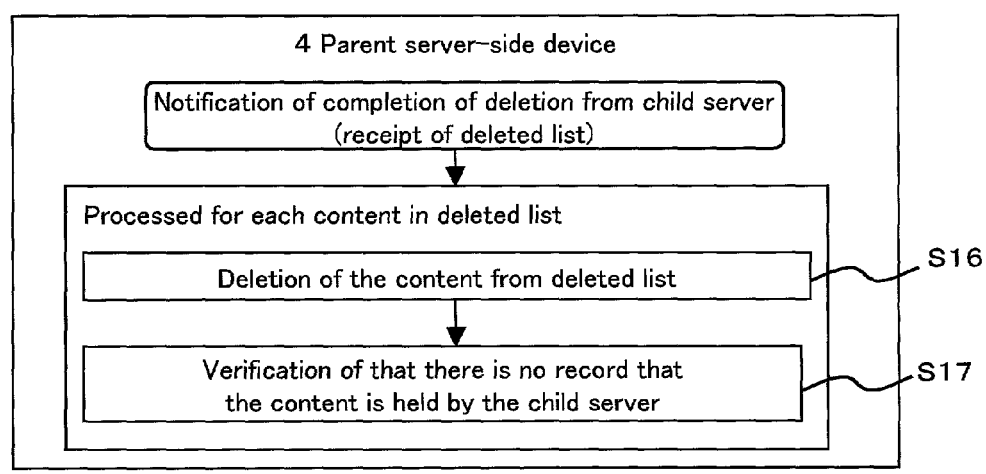
FIG. 17 is a flowchart of the case where a deletion list is generated at the parent server-side device according to the third embodiment.

Although in the above description a method was adopted in which deletion list 12 was generated at child server-side device 5, if a log of access to global contents in all the areas 9 is left in access log 8 at the side of parent server 1, a method may be adopted whereby the deletion list is generated at parent server-side device 4. FIG. 15, FIG. 16 and FIG. 17 are views illustrating an operation flowchart of this example case.

During operation, parent server-side device 4 generates a deletion list 12' in respect of each child server 2 at fixed time intervals. As shown in FIG. 15, the procedure for generating deletion list 12' (steps S1 to S6 of FIG. 15) is similar with the procedure illustrated in FIG. 13 described above (steps S1 to S5 of FIG. 13), but processing to check, by using location information 7, whether the child server 2 in question has the item of contents in question is added (steps S4 and S5 in FIG. 15). Also, of the items of contents that have been added to the deletion list 12', the record that the item of contents in question is held by child server 2 in question is deleted from location information 7 (step S7 of FIG. 15).

Next, child server-side device 5 periodically executes an inquiry directed to parent server-side device 4 as to the existence of distribution requests from the area 9 for which it is responsible, in respect of the contents copied from parent server 1 (step S8 in FIG. 16). After receiving this inquiry, parent server-side device 4 ascertains which child server 2 that originated the inquiry (step S9 in FIG. 16), and checks to establish whether the item of contents that is to be deleted is present on the deletion list 12' corresponding to this child server 2 (step S10 in FIG. 16). If it is indeed present, it returns the deletion list 12' to the child server-side device 5 that originated the inquiry (step S11 of FIG. 16). In this case also, for deletion list 12', the method of implementation by a set of flags as described above may be adopted.

When child server-side device 5 has received deletion list 12', it initializes the deleted list 13, constituting information as to the items of contents that have already been deleted (step S12 in FIG. 16). Next, for each of the items of contents contained in deletion list 12', it deletes these items of contents from the child server 2 in question (step S13 in FIG. 16), and adds the name of the deleted item of contents to the deleted list 13 (step S14 in FIG. 16). If processing has been completed in respect of all the items of contents in deletion list 13, deleted list 13 is transmitted to parent server-side device 4, and this is notified of completion of deletion (step S15 of FIG. 16). Just as in the case of deletion list 12', the method of implementation using a set of flags may be adopted for deleted list 13. Also, the method may be adopted of notifying parent server-side device 4 every time an item of contents is deleted at child server 2.

Once parent server-side device 4 has received notification of completion of deletion, for each item of contents contained in the deleted list 13, it deletes the contents in question from deletion list 12' in respect of the child server 2 that originated the notification (step S16 in FIG. 17) and also verifies that there is no record in location information 7 of the child server 2 that originated the communication having the item of contents in question (step S17 in FIG. 17).

Although, in the above description, a method was described wherein inquiry is periodically made from the side of child server 2, it would be possible to adopt a method in which deletion of contents is prompted by accessing child server 2 periodically from the side of parent server 1 in conjunction with generation of the deletion list 12' at parent server-side device 4 described with reference to FIG. 15.

Figure 18:
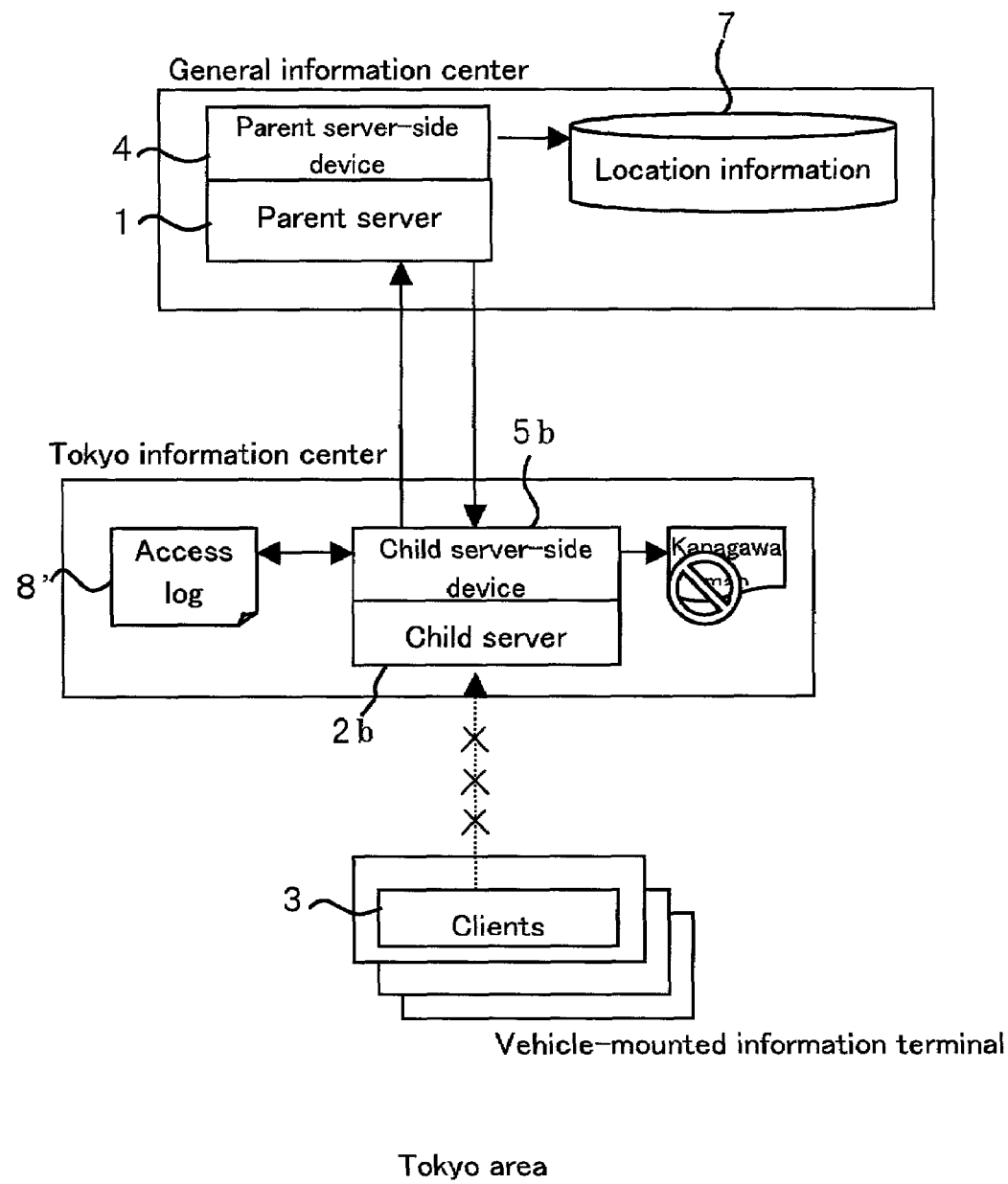
FIG. 18 is a view showing a practical example of a distribution system according to the third embodiment.
Figure 19:
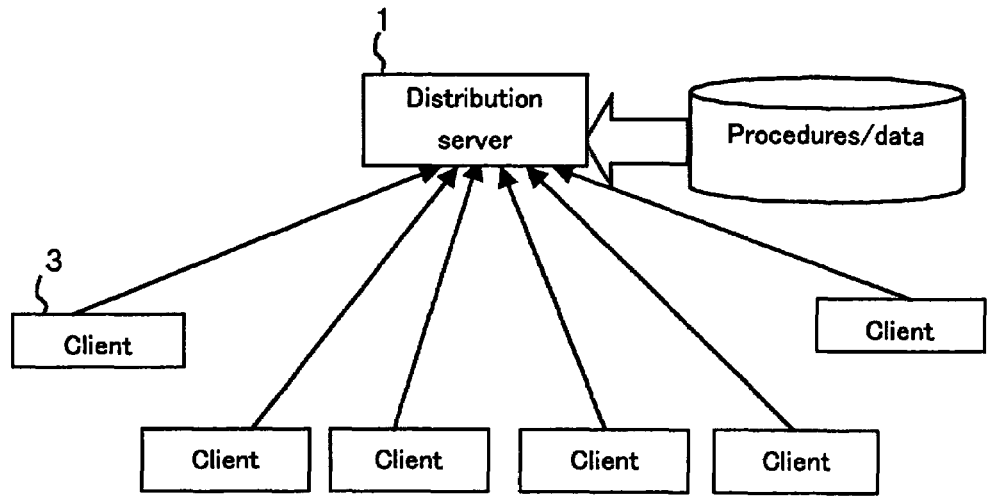
FIG. 19 is a layout diagram illustrating an example of a prior art distribution system.
Figure 20:
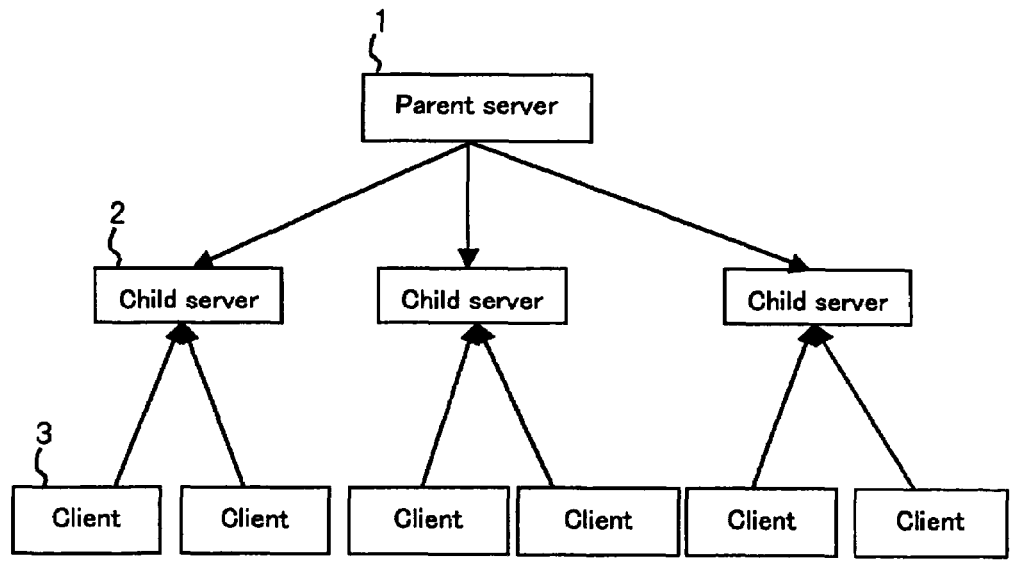
FIG. 20 is a layout diagram illustrating a further example of a prior art distribution system.

FIG. 18 is a view showing a practical example of a distribution system according to a third embodiment. In this practical example, a scenario similar to that of the practical example described with reference to FIG. 6 and FIG. 11 is assumed. That is, it is assumed that an event that was held in the Kanagawa area has finished, and that accesses to the Kanagawa MAP from clients 3 (vehicle-mounted information terminals) situated in the Tokyo area have ceased.

In this case, since there are scarcely any records of access of the Kanagawa MAP in the access log 8' of the Tokyo Information Center, the Kanagawa MAP is put on the deletion list 12 compiled at the child server-side device 5b, with the result that, after updating of the location information 7 at the side of parent server 1, the Kanagawa MAP is deleted from child server 2b (Tokyo Information Center).

As described above, by employing the distribution system according to the third embodiment, contents in respect of which requests for distribution are few can be automatically deleted from child server 2, making it possible to achieve efficient utilization of resources at the server and making administrative action to perform deletion unnecessary. Also, it can be employed together with a system according to the first and/or second embodiment. In this case, contents held by the child server 2 can be dynamically added/deleted in response to dynamically changing distribution requests, making it possible to distribute contents of high request frequency efficiently to clients 3 from child server 2. An even more refined distribution system is thereby constituted. It should be noted that, just as in the case of the other embodiments, even in the case of a distribution configuration comprising three or more layers, a similar realization of contents can be achieved between servers that are in a parent server/child server relationship.

With a distribution system according to the example first, second and third embodiments described above, load concentration on the parent server and network connected to the parent server can be avoided without having to copy all the global contents to all the child servers. Also, since the changeover of distribution source server for this purpose and copying/deletion of contents are performed automatically, the administrative load on the server manager and client users can be alleviated.

The scope of protection of the present invention is not restricted to the example embodiments described above but extends to the invention set out in the claims and equivalents thereof.

As described above, according to an aspect of the present invention, the source of contents distribution is automatically changed over to the child server that is closest to the client originating the request, and copying of contents onto the child server and deletion of contents from the child server are performed automatically in accordance with the frequency etc of distribution requests. Consequently, the amount of the information to be transferred between the clients and the parent server can be reduced, the load on the parent server and network connected to the parent server can be alleviated, and the burden on the managers and users of the distribution system can be alleviated. Also, there is no need to hold contents whose frequency of use is low on the child server, so the beneficial effect is achieved of making it possible to utilize the child server resources efficiently.

What is claimed is:

1. A distribution system connected to clients through communication circuits, comprising:
a parent server and child servers, wherein:
the parent server comprises:
a receiving unit receiving an area identification representing a current geographical position of one of the clients and identification information of contents, distribution of which is requested by the one of the clients, and
a selecting unit selecting one of the child servers that holds the contents, distribution of which is requested, and which child server is closest to the one of the clients that originates the distribution request, using the received area identification and identification information, and notifying the one of the clients that originates the distribution request of logical position information of the selected one of the child servers, and
each child server comprises:
a distributing unit distributing the contents, distribution of which is requested by the one of the clients,
wherein the selecting unit automatically reselects one of the child servers upon the current geographical position of the one of the clients changing, and
wherein the current geographical position is obtained from a Global Positioning System.

2. The distribution system according to claim 1, wherein:
the parent server further comprises an ascertaining unit ascertaining a presence or an absence of the distribution request or a frequency of distribution requests for the contents from the one of the clients situated in an area for which the one of the child servers is responsible; and
the child server further comprises an acquiring unit acquiring and copying from the parent server the contents that are not held by the one of the child servers, on a basis of the ascertained presence or the absence of the distribution request or the frequency of distribution requests.

3. The distribution system according to claim 2, wherein said child server further comprises:
an ascertaining unit ascertaining the presence or the absence of the distribution request or the frequency of distribution requests for the contents from the one of the clients situated in the area for which the one of the child servers is responsible, and
a deleting unit deleting from the one of the child servers the contents which are held by the one of the child servers on the basis of the ascertained presence or absence of the distribution request or the frequency of distribution requests.

4. The distribution system according to claim 2, wherein said child server further comprises:
a deleting unit deleting from the one of the child servers the contents which are held by the one of the child servers on the basis of the presence or absence of the distribution request or the frequency of distribution requests ascertained by the parent server.

5. A distribution system connected to clients through communication circuits, comprising:
a parent server and child servers, wherein:
the parent server comprises:
an ascertaining unit ascertaining a frequency of distribution requests for contents from one of the clients situated in an area for which a one of the child servers is responsible; and
each child server comprises:
an acquiring unit acquiring and copying from the parent server the contents that are not held by the one of the child servers,
and wherein a current geographical position of the one of the clients is obtained from a Global Positioning System.

6. The distribution system according to claim 5, wherein the child server further comprises:
an ascertaining unit ascertaining the frequency of distribution requests for the contents from the one of the clients situated in the area for which the one of the child servers is responsible; and
a deleting unit deleting from the one of the child servers the contents, which are held by the one of the child servers, upon the ascertained frequency of distribution requests frequency being less than a previously set threshold value.

7. The distribution system according to claim 5, wherein the child server further comprises:
a deleting unit deleting from the one of the child servers the contents which are held by the one of the child servers upon the ascertained frequency of distribution requests frequency being less than a previously set threshold value.

8. A distribution system connected to a plurality of clients through communication circuits, comprising:
a parent server and child servers, wherein:
the clients communicate to the parent server an area identification representing a current geographical position of one of the clients and identification information of contents, distribution of which is requested by the one of the clients,
the parent server selects, on a basis of the area identification of the one of the clients and the contents identification information that is communicated thereto, one of the child servers that holds the contents, distribution of which is requested and that is closest to the one of the clients that originates the distribution request, communicates logical position information of the selected one of the child servers to the one of the clients originating the distribution request, and automatically reselects one of the child servers upon the current geographical position of the one of the clients changing; and
the one of the clients that originates the distribution request receives the contents, distribution of which is requested from the selected one of the child servers, on the basis of the logical position information of the selected one of the child servers,
wherein the current geographical position of the one of the clients is obtained from a Global Positioning System.

9. The distribution system according to claim 8, wherein receipt performed by the one of the clients of the contents from the selected one of the child servers is conducted using a program downloaded to the one of the clients from the parent server when the request for the distribution of the contents is made.

10. A computer program product incorporated on a computer-readable storage medium for storing computer readable program code embodied therein that operates on a parent server in a distribution system having the parent server and a plurality of child servers and connected with a plurality of clients through communication circuits, so that contents held by the parent server and/or the child servers are distributed to the clients, the operations of the computer program product comprising:
selecting one of the child servers that holds the contents, distribution of which is requested and that is closest to one of the clients that made the distribution request on a basis of an area identification representing a current geographical position of the one of the clients that makes the distribution request for the contents and identification information of the contents, the distribution of which is requested by the one of the clients;
communicating logical position information of the selected one of the child servers to the one of the clients that makes the distribution request; and
automatically reselecting one of the child servers upon the current geographical position of the one of the clients changing,
wherein the current geographical position of the one of the clients is obtained from a Global Positioning System.

11. A computer program product incorporated on a computer-readable storage medium for storing computer readable program code embodied therein that operates on a parent server in a distribution system having the parent server and a plurality of child servers, and connected with a plurality of clients through communication circuits, so that the contents held by the parent server and/or the child servers are distributed to the clients, the operations of the computer program product comprising:
ascertaining a frequency of distribution requests of contents from clients situated within an area for which one of the child servers is responsible and wherein a geographical position of the clients is obtained from a Global Positioning System; and
giving the one of the child servers notification to prompt copying from the parent server of the contents that are not held by the child server, or deleting from the one of the child servers the contents that are held by the one of the child servers, on a basis of the frequency of distribution requests.

12. A computer program product incorporated on a computer-readable storage medium for storing computer readable program code embodied therein that operates on a child server in a distribution system having a parent server and a plurality of child servers and connected with a plurality of clients through communication circuits, so that contents held by the parent server and/or the child servers are distributed to the clients, the operations of the computer program product comprising:
a program code copying to one of the child servers from the parent server the contents that are not held by the one of the child servers, or deleting from the child server the contents that are held by the one of the child servers, on a basis of a frequency of distribution requests for the contents from the clients situated in an area for which one of the child servers is responsible,
wherein a geographical position of the clients is obtained from a Global Positioning System.

13. A method of distributing contents to clients in a distribution system including a parent server and a plurality of child servers and connected with the plurality of clients through communication circuits, comprising:
receiving identification information by the parent server of the contents, distribution of which is requested and an area identification representing a current geographical position of one of the clients that makes the request for the distribution of the contents;
selecting by the parent server, on a basis of the received area identification of the one of the clients and contents identification information, one of the child servers which has the contents that is requested for distribution and that is closest to the one of the clients that makes the request for distribution, and notifying the one of the clients that makes the request for distribution of logical position information of the selected one of the child servers;
distributing the contents, distribution of which is requested by the selected one of the child servers, in response to the request of the one of the clients; and
automatically reselecting one of the child servers upon the current geographical position of the one of the clients changing,
wherein the current geographical position of the one of the clients is obtained from a Global Positioning System.

14. A method of distributing contents to clients in a distribution system including a parent server and a plurality of child servers and connected with the plurality of clients through communication circuits, comprising:

ascertaining a frequency of distribution requests, in respect of contents from clients situated in an area for which one of the child servers is responsible;

copying contents which are not held on the one of the child servers from the parent server to the one of the child servers, or deleting the contents from the one of the child servers, on a basis of the frequency of distribution requests; and performing the distribution from the one of the child server servers in response to the distribution request for the contents held by the one of the child servers from the clients situated in the area for which the one of the child server servers is responsible, wherein the current geographical position of the one of the clients is obtained from a Global Positioning System.

* * * * *

UNITED STATES PATENT AND TRADEMARK OFFICE
CERTIFICATE OF CORRECTION

| | |
|---|---|
| PATENT NO. | : 7,209,941 B2 |
| APPLICATION NO. | : 09/781326 |
| DATED | : April 24, 2007 |
| INVENTOR(S) | : Toyoaki Furusawa et al. |

It is certified that error appears in the above-identified patent and that said Letters Patent is hereby corrected as shown below:

Column 20, Line 2, before "servers in" delete "server".

Column 20, Line 5, after "child" delete "server".

Signed and Sealed this

Eighteenth Day of September, 2007

JON W. DUDAS
*Director of the United States Patent and Trademark Office*